UNITED STATES PATENT OFFICE.

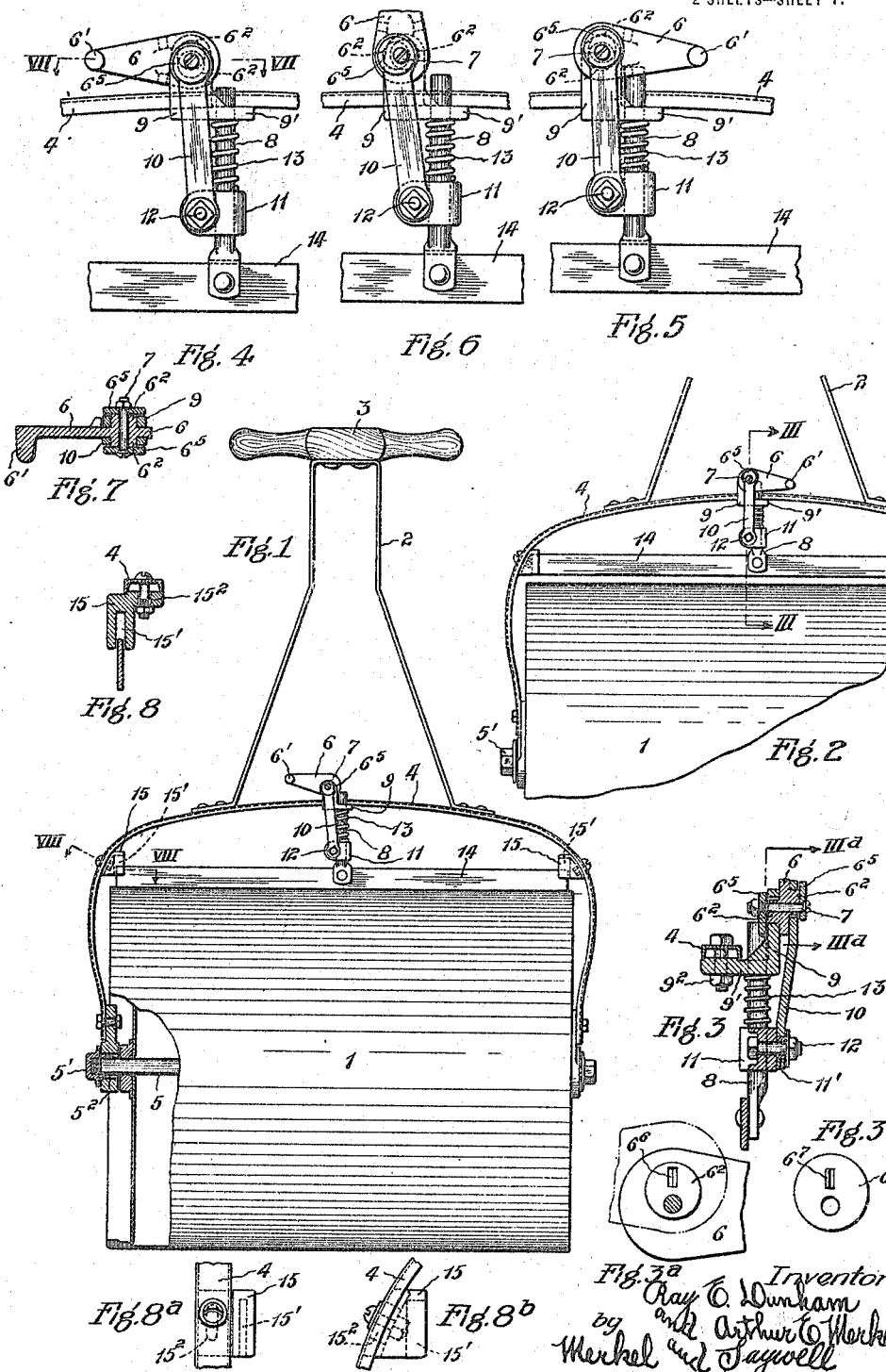

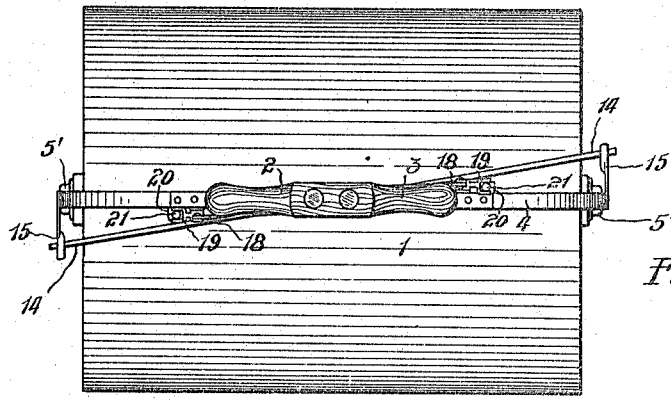
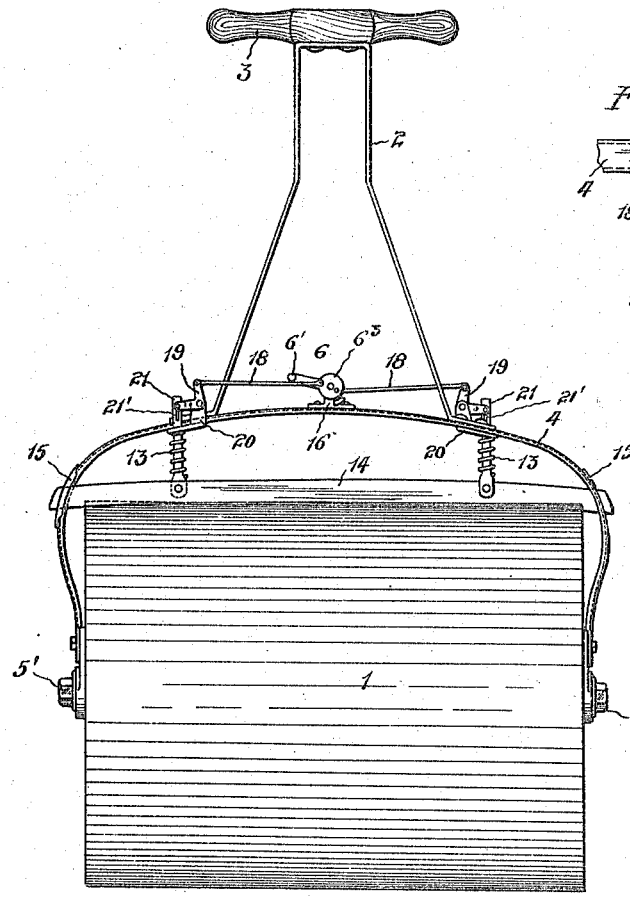
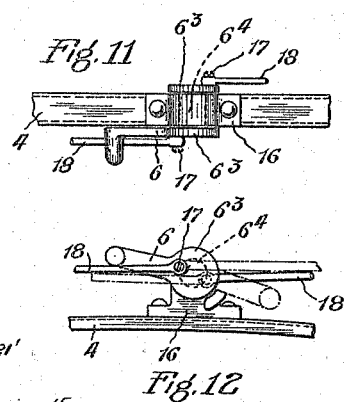
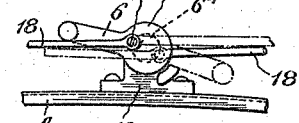

RAY E. DUNHAM, OF BEREA, AND ARTHUR E. MERKEL, OF CLEVELAND, OHIO, ASSIGNORS TO THE DUNHAM COMPANY, OF BEREA, OHIO, A CORPORATION OF OHIO.

COMBINED SCRAPER AND HANDLE-LOCK FOR LAWN-ROLLERS.

1,286,564.  Specification of Letters Patent.  Patented Dec. 3, 1918.

Application filed June 6, 1917. Serial No. 173,161.

*To all whom it may concern:*

Be it known that we, RAY E. DUNHAM and ARTHUR E. MERKEL, citizens of the United States, residents, respectively, of Berea, county of Cuyahoga, and State of Ohio, and Cleveland, county of Cuyahoga, and State of Ohio, have invented new and useful Improvements in Combined Scrapers and Handle-Locks for Lawn-Rollers, of which the following is a specification, the principle of the invention being herein explained and the best mode in which we have contemplated applying that principle, so as to distinguish it from other inventions.

Our invention relates to land rollers and particularly to that class of such rollers which are "water weight rollers" and particularly used for rolling lawns, the object of the invention being to provide a lawn roller with means for scraping or cleaning the cylindrical surface of the drum, which means may incidentally be so disposed as to form a lock for the handle and are so disposed in the embodiment of our invention herein shown and described. More particularly, our invention relates to improvements upon combined scrapers and handle locks for lawn rollers described and claimed in U. S. Letters Patent No. 1,218,635, issued to R. E. Dunham, one of the applicants herein.

Our improvements consist in providing such combined scrapers and handle locks for lawn rollers with means whereby the scrapers may be positively locked to the surface of the drum so as to provide a lock for the roller handle and may also be resiliently locked to the surface of the drum so that the scraper may perform more efficient service in adjusting itself to the drum's surface for the scraping of uneven and varying sized particles therefrom; also, there is shown means included within our broad improvements which are provided with specific scraper mountings whereby the scraper may be carried at an angle to the plane of the drum axis so as to scrape by means of a shearing action rather than by flat blunt contact; furthermore, specific means for mounting the scraper by double support.

The annexed drawings and the following description set forth in detail certain means embodying our invention, the disclosed means, however, constituting but one of various mechanical forms in which the principle of the invention may be applied.

In said annexed drawings:

Figure 1 represents a front elevation of a combined scraper and handle lock for lawn rollers embodying our invention, the same showing a scraper mounted parallel with the drum axis and by a single support, said view, furthermore, being shown partly broken away in order to disclose the connection of the drum heads with the drum body and the protection by means of hub caps over the end of the axle for the roller bearings upon which the handle is oscillatorily mounted, as will be hereinafter fully explained; Fig. 2 represents a broken elevation of the parts shown in Fig. 1 in which a manually-operated eccentric, hereinafter fully described, is shown in that extreme position which results in the lifting of the scraper bar entirely free from the surface of the drum; Fig. 3 represents an enlarged vertical transverse section taken in the plane indicated by the line III—III, Fig. 2; Fig. 3ª represents an enlarged vertical longitudinal section of a fragmentary portion of the parts shown in Fig. 3 and taken in the plane indicated by the line IIIª—IIIª, Fig. 3, a washer, hereinafter more fully mentioned, not being shown; Fig. 3ᵇ represents an enlarged rear view of the washer not shown in Fig. 3ª; Figs. 4, 5 and 6 represent, respectively, enlarged elevations of a manually-operable eccentric and connected parts in two extreme positions and an intermediate position, as will be hereinafter fully explained; Fig. 7 represents a horizontal longitudinal section taken in the plane indicated by the line VII—VII, Fig. 4; Fig. 8 represents an enlarged vertical transverse section taken in the plane indicated by the line VIII—VIII, Fig. 1; Figs. 8ª and 8ᵇ represent, respectively, a side elevation and rear elevation of parts shown in Fig. 8; Fig. 9 represents a front elevation of our improved combined scraper and handle lock for lawn rollers in which a modified form of eccentric is utilized and in which a scraper bar is mounted at an angle to the drum axis and further is supported by a pair of uprights, instead of a single support, as will be hereinafter fully explained; Fig. 10 represents a plan view of the parts shown in Fig. 9; and Figs. 11 and 12 represent, respectively, upon an enlarged scale, a plan view and a front elevation of the eccentric shown in Fig. 9 and connected parts.

Referring to the annexed drawings, our improved combined scraper and handle lock comprises a drum 1 upon which is oscillatorily mounted a handle provided with a handle portion proper 2, a grip portion 3 and a transverse member 4, the axle upon which the handle is thus mounted being designated at 5, the mounting being by means of roller bearings 5², the same being retained and protected by the hub caps 5'. Mounted upon the transverse member 4 of the handle 2 is a manually-operable eccentric 6 provided with a suitable handle 6', the eccentric action of which is obtained by means of lateral projections 6², providing journal surfaces, one upon each face, as is plainly shown in Figs. 3 and 7. Said eccentric 6 is supported upon the transverse member 4 by means of an upright member 9 having a lateral extension 9' which is bolted to the transverse channel member 4 by means of bolt 9² and is provided with a slot for the reception of a rod 8, hereinafter more fully mentioned. Said upright member 9 is provided with a bearing surface for one of the eccentric journal projections 6² which is loosely journaled therein. The other eccentric projection 6² forms a journal surface upon which is mounted a depending arm 10, the lower end of which is mounted upon a journal surface 11' of a member 11 receiving a bolt 12 intersecting said journal surface and provided with a hole through which projects the rod 8 hereinbefore mentioned. A pin 7 intersects and holds tightly together the several elements 6, 6², 9 and 10, suitable washers 6⁵ being provided, as plainly shown in Figs. 3, 3ᵃ and 3ᵇ, said eccentric portions 6² being provided with suitable slots 6⁶ to receive coöperating lugs 6⁷ formed upon the rear faces of the washers 6⁵, respectively. It should be noted, as is plainly shown in Fig. 3, that the depending member 10 and the vertical member 9 are both loosely mounted upon the eccentric journals 6², respectively. Secured to and rigidly carried upon the lower end of said rod 8 is the scraper bar 14. A coil spring 13 is contained between the lateral extension 9' of the member 9 and the member 11, surrounds the rod 8, and is so arranged as to normally hold the scraper bar 14 against the surface of the drum 1. It might be noted that when the scraper bar 14 is being utilized for scraping purposes, the same can be satisfactorily effected, and yet allow for uneven surfaces and varying sized particles of material being scraped, by retaining the scraper bar against the surface of the drum through means of the spring 13, the manually-operable eccentric 6 being then in its intermediate position, plainly shown in Fig. 6, and having a sphere of action somewhat less than the distance between its two extreme positions, shown in Figs. 4 and 5, accordingly as the adjustments of the scraper 14 upon the drum's surface, acting through the spring 13, actuates said eccentric. When it is desired positively to lock the scraper 14 against the surface of the drum, or when it is desired positively to lock the same entirely out of engagement with said surface, the same is accomplished by means of moving the eccentric 6 into the extreme positions shown in Figs. 4 and 5, respectively. Two U-shaped members 15 are secured to opposite sides of the transverse member 4 and are formed with guides 15' into which the ends of the scraper bar 14 project, said members 15 being adjustably secured to the transverse member 4 by means of the screws 4' secured in the slots 15², plainly shown in Fig. 8ᵇ.

Referring now to the modified form of our combined scraper and handle lock for lawn rollers, shown in Figs. 9, 10, 11 and 12, it will be noted that a supporting bearing member 16 is mounted upon the transverse member 4 of the handle 2 and that journaled in said member 16 by means of a connecting journal portion 6⁴ are two disks 6³ of the eccentric member 6. Eccentrically connected by pins 17 to said disks 6³, respectively, are a pair of rods 18 extending in opposite directions and connected at their other ends, respectively to a pair of bell crank levers 19, the other ends of which levers are in turn connected to the upper ends, respectively, of upright rods 21 forming supports for a scraper bar 14, as plainly shown in Fig. 9. Said scraper bar extends generally longitudinally across substantially the whole surface of the drum 1, as does the bar shown in Figs. 1 and 2, but is mounted at an angle to the drum axis and said result is herein specifically accomplished by reason of the fact that the members 20, which are connected to the under surface of the transverse member 4 and which support the links 19 and are provided with holes through which the rods 21 project, are carried upon opposite sides of the transverse member 4 so that the action of the scraper, which in this form of device, lies in the periphery of an ellipse, is a shearing one, as will be readily understood. The springs 13 normally hold the scraper 14 against the surface of the drum 1 but when any uneven condition is encountered, the scraper 14, against the action of the springs, is moved upwardly by reason of the fact that in the upper ends of the rods 21 are provided elongated slots 21' within which the end of the links 19 are secured and may move, relatively, as plainly shown in Fig. 9. It is apparent from an inspection of the full line and dotted line positions in Fig. 12 of the eccentric 6 that the rotation of the disk 6³ to one extreme position will effect the movement of the scraper 14 entirely out of engagement with the drum surface, and that the movement to the other extreme position will effect the engagement of the scraper with the drum surface, the former extreme position, shown in dotted lines in Fig. 12, being a positive lock for the scraper, and the latter extreme position being merely a resiliently retained lock which will be constantly disturbed by the adjustments of the scraper to the drum's surface.

What we claim is:

1. In a land roller, the combination of a drum; a handle mounted upon the latter; a suitably supported movable scraper bar; and means for moving said scraper bar into and out of the vicinity of the drum including means for locking the same against the surface of the drum and for locking the same in its outer extreme position, said means being also adapted to hold the scraper-bar resiliently against the surface of the drum.

2. In a land roller, the combination of a drum; an oscillatory handle mounted upon the latter, a movable scraper bar mounted upon said handle; and means for moving said scraper bar into and out of the vicinity of the drum including means for locking the same against the surface of the drum and for locking the same in its outer extreme position, said means being also adapted to hold the scraper bar resiliently against the surface of the drum.

3. In a land roller, the combination of a drum; an oscillatory handle mounted upon the latter; a manually-operable eccentric mounted upon said handle; a scraper supported by said eccentric and arranged by the actuation of the latter to be moved into and out of the vicinity of the drum, one extreme position of said eccentric locking said scraper against the surface of the drum to form a lock for the handle, the other extreme position of said eccentric lifting said scraper entirely free from the surface of the drum; and resilient means tending to hold said scraper against the surface of the drum in an intermediate position of said eccentric.

4. In a land roller, the combination of a drum; an oscillatory handle mounted upon the latter and including a transverse member; a manually-operable eccentric mounted upon said transverse member and adapted to be locked in its extreme positions and reciprocably movable under stress or jar when not locked in an extreme position; a scraper arranged to be caused to engage and disengage the cylindrical surface of the drum by the movement of said eccentric to its extreme positions; and a spring arranged to tend to hold said scraper in engagement with the drum surface and effective in this tendency when the eccentric is not locked in an extreme position.

Signed by us, this 26th day of May, 1917.

R. E. DUNHAM.
A. E. MERKEL.

Copies of this patent may be obtained for five cents each, by addressing the "Commissioner of Patents, Washington, D. C."